US008502667B2

(12) United States Patent
Narayanan (10) Patent No.: US 8,502,667 B2
(45) Date of Patent: Aug. 6, 2013

(54) ACTIVITY BASED MANAGEMENT SYSTEM (76) Inventor: Rangaswamy Narayanan, Coimbatore (IN)

(*) Notice: Subject to any disclaimer, the term of this patent is extended or adjusted under 35 U.S.C. 154(b) by 408 days.

(21) Appl. No.: 12/996,863

(22) PCT Filed: Jun. 9, 2008

(86) PCT No.: PCT/IN2008/000364
§ 371 (c)(1),
(2), (4) Date: Dec. 8, 2010

(87) PCT Pub. No.: WO2009/150658
PCT Pub. Date: Dec. 17, 2009

(65) Prior Publication Data
US 2011/0084797 A1    Apr. 14, 2011

(51) Int. Cl.
*G08B 13/14* (2006.01)
(52) U.S. Cl.
USPC ............... 340/568.1; 340/5.51; 340/5.8
(58) Field of Classification Search
USPC ............... 340/5.51, 5.65, 5.73, 5.8
See application file for complete search history.

(56) References Cited

U.S. PATENT DOCUMENTS

| 4,661,806 | A | * | 4/1987 | Peters et al. ............... 340/568.1 |
|---|---|---|---|---|
| 5,204,663 | A | * | 4/1993 | Lee ............................. 340/5.28 |
| 5,245,329 | A | * | 9/1993 | Gokcebay .................... 340/5.33 |
| 5,337,043 | A | * | 8/1994 | Gokcebay .................... 340/5.67 |
| 5,475,377 | A | * | 12/1995 | Lee ............................. 340/5.9 |
| 5,550,529 | A | * | 8/1996 | Burge .......................... 340/5.6 |
| 5,799,286 | A | * | 8/1998 | Morgan et al. ............... 705/30 |
| 6,075,441 | A | * | 6/2000 | Maloney ...................... 340/568.1 |
| 6,431,438 | B1 | * | 8/2002 | Pires et al. ................... 235/375 |
| 6,609,657 | B2 | * | 8/2003 | Pires ............................ 235/382 |
| 6,629,019 | B2 | * | 9/2003 | Legge et al. ................. 700/237 |
| 6,690,673 | B1 | * | 2/2004 | Jarvis .......................... 370/401 |
| 6,707,381 | B1 | * | 3/2004 | Maloney ...................... 340/568.1 |
| 6,882,282 | B1 | * | 4/2005 | Lie-Nielsen et al. ....... 340/686.1 |
| 6,891,473 | B2 | * | 5/2005 | Maloney ...................... 340/568.1 |
| 6,900,720 | B2 | * | 5/2005 | Denison et al. ............. 340/5.9 |
| 6,981,639 | B1 | | 1/2006 | Pires |
| 7,061,367 | B2 | * | 6/2006 | Mosgrove et al. .......... 340/5.21 |
| 7,116,228 | B1 | * | 10/2006 | Singleton .................... 340/572.1 |
| 7,123,127 | B2 | * | 10/2006 | Mosgrove et al. .......... 340/5.21 |
| 7,495,543 | B2 | * | 2/2009 | Denison et al. ............. 340/5.23 |
| 7,949,541 | B2 | * | 5/2011 | McGinn et al. .............. 705/1.1 |
| 8,248,206 | B2 | * | 8/2012 | Sato et al. .................... 340/5.73 |

(Continued)

FOREIGN PATENT DOCUMENTS

WO    WO0175811 A1    11/2001

OTHER PUBLICATIONS

International Search Report, PCT/IN2008/000364, mailed Jul. 27, 2010.

*Primary Examiner* — Jennifer Mehmood
*Assistant Examiner* — Rufus Point
(74) *Attorney, Agent, or Firm* — Alix, Yale & Ristas, LLP (57) ABSTRACT

The present invention is directed to management of activities by the operation of keys for performing said activities that are monitored for timing of any activity itself, its duration and frequency in predefined intervals and more particularly to an activity based key monitoring and management system. The present system provides a safe and secured manner of management of activities involving key operation whereby it would be possible to value add to the required authentication and performance of key operative activities in variety of applications and end uses.

15 Claims, 10 Drawing Sheets

U.S. PATENT DOCUMENTS

| | | | |
|---|---|---|---|
| 2005/0285716 A1* | 12/2005 | Denison et al. | 340/5.2 |
| 2008/0186130 A1* | 8/2008 | Trevino et al. | 340/5.2 |
| 2012/0019360 A1* | 1/2012 | McGinn et al. | 340/5.73 |
| 2012/0326845 A1* | 12/2012 | McGinn et al. | 340/10.1 |

* cited by examiner

Ethernet Output

Relay output

ACTIVITY BASED MANAGEMENT SYSTEM

FIELD OF THE INVENTION

The present invention is directed to management of activities by the operation of keys for performing said activities that are monitored for timing of any activity itself, its duration and frequency in predefined intervals and more particularly to an activity based key monitoring and management system. The activity based Key monitoring and Managing system of the invention basically involves mechanical keys or smart keys or a housed keys interfaced with electronic control devices such as the micro-processor and chip sets, that is programmable and access to key(s) is controlled based on activity assigned to a particular person with provision for authenticating the desired activity by corresponding appropriate ID and password/PIN to a person assigned with a specific task. The present system thus provides a safe and secured manner of management of activities involving key operation whereby it would be possible to value add to the required authentication and performance of key operative activities in variety of applications and end uses.

BACKGROUND ART

It is well known to provide automated activity based management systems such as for providing continuous, dynamic and real time cost information and reports.

U.S. Pat. No. 5,799,286 is directed to an automated activity based management system and a method thereof wherein the information relating to cost or accounting data is compared and validated or benchmarked for comparison for the accounting purpose for the corresponding activities of machine/manpower/service in an organization, is measured and controlled and reports generated as desired, through GUI interface with said activity information.

U.S. Pat. No. 6,431,438 relates to a storage system and identification devices for storing objects associated with devices in stations. Each identification device includes an electronic memory device with a unique code. The storage system receives information relating to each identification device with both its code and the object associated with it. A user can enter information as to a particular object and the system identifies the location of the station holding the identification device, thus identification devices can be returned randomly. This can be used for many objects as small as keys and very large objects connected to the identification devices.

This invention does not relate to activity management system by key control based access/denial of authenticated user to perform predefined activity, control on its time components and sequence and feedback monitoring or status reporting, and therefore does not infringe on the inventive intent of the present invention.

U.S. Pat. No. 6,629,019 provides for a coin operated system for operative access to a video arcade games and slot machines utilizes an automated redemption system comprising a client transponder card with a memory unit, an activity station, a management station and an attendant transponder with a memory unit. Thus the activity management in this invention is redemption oriented and not Identity verification/authentication based access/denial for persons undertaking predefined and coded activities. It does not also involve any key control system for activity management.

U.S. Pat. No. 6,690,673 relates to a method and apparatus for a biometric transponder based activity management system in a defined area, for allow/deny access of a person having identifiable biometric data encoded in a central server/processor for controlled access to area/facility within a defined area or perform a defined activity upon verification of identity of an individual at a display station within the defined area as biometric inputs, which is authenticated from the corresponding encoded data in a central server. The invention thus directed to control entry in a defined area as an element of activity management and do not involve any key control system for controlling multifaceted activities.

U.S. Pat. No. 6,609,657 is on a "System for entrapping objects" wherein disclosed a storage system for storing and entrapping a plurality of objects comprising a system housing; smartkey housing operable to receive and releasably lock a smartkey therein; recesses each of which is associated with a respective smartkey housing; and a plurality of smart keys each of which is associated with an object. Each smartkey comprises a body, a memory device comprising an individualized code and an entrapping arm coupled to the body for entrapping an object positioned in the recess associated with the smart key housing. When the object is positioned within its respective recess and the smartkey is positioned and locked in the smart key housing associated with the recess. The entrapping arm prevent the object from being removed from the associated recess until the smartkey is removed from the respective smartkey housing when the object is removable from the recess. A smartkey with an associated chamber may be applied in controlling door open/close option for selective populace. In particular, the prior art is directed toward a construction where the smartkey operatively engages an entrapping arm that prevent an object being removed from an associated recess.

U.S. Pat. No. 6,981,639 is a prior patent titled "Object storing system with illuminated housing" is an invention directed to a storage system for storing a plurality of objects, wherein one or more objects are each associated with a smartkey; the system comprising a system housing defining a recess, mounted on a front panel and having a smartkey housing supported behind for each recess. A concentrated light source interrupted at least at selective portion in the housing when the smartkey is put in the recess/housing for processing information.

Thus the prior art is same in providing security except for provision of an illuminating light source used for information processing to move one associated object by the operation of a smart key in respective housing. The system does not further provide any central server based support for the status and monitoring of objects or any key authentication. The system is primarily directed to storing as the principal activity and access control thereof.

OBJECTS OF THE INVENTION

It is thus the basic object of the present invention to provide for an activity based key management and key control system adapted to monitor all activities, event classification, usage information and generation of exception reports and available audit trail for a particular action.

Another object of the present invention is directed to an activity based key management and key control system involving selective key safe boxes, robust processes and continuous monitoring of operations using either a server based system or stand alone software system.

Yet another object of the present invention is directed to an activity based key management and key control system wherein the key management system is adapted such that keys can be monitored, the keys can be limited by access based on allowable activity, time restriction for the activity, data can be mined for exception in number of activities and timings of activities, it would have no restriction in usage at any point in time and can also record all activities.

Another object of the present invention is directed to an activity based key safe involving a key control box which would be adapted for electromagnetic communications technique for exchanging signals between key and keybox.

Yet further object of the present invention is directed to an activity based key management and key control system comprising a central monitoring application as part of the event log and adapted to monitor non-compliance of rules and generate error or alarm signals if applicable.

A further object of the present invention is directed to an activity based key management and key control system adapted to generate reports providing various details of events, exceptions, alarms for user friendly activity monitoring.

Another object of the present invention is directed to an activity based key management and key control system involving multi levels of access to the system such as administration level, maintenance level and client level.

SUMMARY OF THE INVENTION

Thus according to the basic aspect of the present invention there is provided an activity based key management system, comprising:
One or more keyboxes which houses electronic holding devices adapted to hold one or more keys;
a integrated activity management system;
a plurality of activity operationally defined;
a interface to administer access to the keys based on one or more defined activities, wherein:
each activity is mapped to one or more keys;
users are authorized to perform one or more of the defined activities;
said association of activities with keys and users resulting in the system managing keys in accordance with the defined activities.

In the above activity based key monitoring and management system the said keys would either be mechanical key or smart key or a housed key in one or more key box.

In accordance with another aspect in the activity based key monitoring and management system wherein the access of individual keys based on activities, include operational time, date, duration and frequency.

According to further aspect of the present invention the said integrated activity management system provides for creation of a plurality of user designed activities locally at the keybox and/or remotely.

Importantly, the said activity management system is configured to obtain administrative and or user input from the keybox and transmit the same to a standalone or networked computer to facilitate central monitoring.

The said activity management system includes a database where the data relating to the control rules of the activities are defined and maintained.

According to further aspect of the present invention the said interface provides real time and/or on demand and/or synchronizable data interface between the keybox and the central monitoring unit.

The said keybox has at least one memory device, processor, input and output ports.

In accordance with another aspect in the activity based key monitoring and management system the data is stored in the database and the keybox to facilitate activity based key management.

The keybox comprises an operators terminal and key control board said operators terminal having user interface functions preferably including keyboard and display, expandable memory storage, internet connectivity, real time clock, buzzer and serial ports which is powered by an processor and operating system, said operating terminal adapted to communicate with key control board adapted to monitor and control the keys, said key control board adapted to monitor and control the keys, said key control board having a microcontroller controlling the solenoids and LED indicators and monitors the limit switches.

Importantly, in the said activity based key monitoring and management system user authentication can be by means of user id and password, proximity or magnetic cards, biometric or other modes of user authentication.

Importantly, the key/keybox in the said activity based key monitoring and management system is adapted to allow access after (i) user authentication; (ii) activity for which access is required (iii) keys mapped for the chosen activity.

The key is monitored and subject to audit trial once it is removed from the key box, the key box adapted to provide alerts on any non conformance of the defined control rules.

According to further aspect of the present invention the activity based key monitoring and management system comprises:
Key control box having a secure enclosure for housing the keys associated with assets/components; adapted to provide controlled access based on user profile for access to keys; a keyboard in the form of a key pad; means for capturing and transmitting events and data for central monitoring and analysis; means for securing the keys during exceptional events/circumstances required special security; and electromagnetic communications means for exchanging signals between key and key boxes.

Importantly the key/keybox in the activity based key monitoring and management system is adapted such as to allow the user to the activity allocated and allows access to only for the activities for which he/she is authorized.

Advantageously further the activity based key monitoring and management system is adapted to capture and transmit to the said central monitoring unit as part of the event log the following inputs:
keybox number;
user id;
date and time;
activity code;
exception code; and
nature of exception and description.

The central monitoring unit in the activity based key monitoring and management system is further adapted to verify the errors and/or exceptions and generate related alerts for the required recipients as per the system configuration.

Importantly the key/keybox is adapted to generate reports including various details of events, exceptions, alerts with various filters including specific time period, specific keys, specific users or user category, answering specific query from database to generate the data required for any specific parameter with respect to another parameter or parameters (single or multiple).

In accordance with a preferred aspect the said keybox is adapted to provide for a plurality of hierarchical levels of access.

Importantly, the system will secure the keys that provide access to the critical equipments or components associated directly or indirectly with delivering the quality and quantity of product and monitor the activities associated with the access of the critical equipments/components. Also, the system allows or deny access to any person assigned with a specific activity on verification/authorization of the parameters—
Activity for which access is required;
User ID (captured through magnetic card);
Password in the form of a unique PIN number;

Once a key, corresponding to an activity, is removed from the key safe box for the particular activity, the same is recorded. This record is used for audit trail such as the time in and time out of any key. If the key is returned after a predetermined particular time, the system provides the option that the keys box raises an alarm.

All events, alarms, exceptions generated by the key box is transmitted to the central monitoring application. The box is also capable to store events in case of communication loss and transmit the same on resumption of network connectivity.

The event log shall contain at least the details, captured and transmitted to central monitoring application, comprising—Key safe number, User ID, date and time, Activity code, exception code (if there is any generated), nature of exception and description.

All the parameters defining exception is configurable and the system capture all events, alarms, exceptions and send to a central application for monitoring and analysis.

A central monitoring application is adapted to verify the errors/exceptions with the set rules and generate the required mail for escalation/non-conformance and sent to the recipients as per the configuration. In particular, the following minimum details would be captured and transmitted to central monitoring application as part of the event log which include key safe number (specific id for location) and site; user id; date and time; activity code; exception code (if there is any generated) and nature of exception and description.

In case of any non-conformation of rules, the system will record an error or alarm. An exception mail should be generated, in line with the defined error. Such error leading to exceptions could be due to following:
Error due to key being accessed by individual not mapped to the profile;
Error due to access of a key outside specified time slot;
Error due to key being held outside for time periods exceeding a defined value;
Error due to key access in violation of the frequency norms-higher than defined;
Error due to violations as stated above in a defined time period such as week, fortnight or month.

Also, all the parameters defining exception should be configurable.

The system is capable to generate answer to specific query from database to generate the data required for any specific parameter with respect to another parameter or parameters (single or multiple).

Importantly, the system is further provided for following levels for access to the system:
Administrator Level 1—for changing configuration of box or properties in the software matrix.
Administrator Level 2—for adding/deleting users, changing user passwords;
Maintenance—for accessing box for maintenance purpose.
Clients—for viewing data relating to any key box on the network.

The system allow the administrator and user to access and change configuration or view data as per the access defined from any location on the network.

The Server is dedicated to perform following activities:
Receive data from key boxes;
Validate if the key box is alive, operating in order and reports accordingly;
Stores data using well-known databases;
Backs up data;
Ensures handshake and acceptance when receiving data ensuring complete receipt of data;
Encrypted transfer using two fish method;
Allows user to check connection status on individual boxes when in doubt;
Direction Issues/Rules:
Control over multiple activity at the same time for the same user-accepted and required by customer;
One activity can be done by one user only at a time-accepted and required by customer.
maximum time frame of activity in a key box-configurable and gives local alarm.

Importantly the features of the key control box comprising an Operator terminal and Key control Board, wherein said Operator terminal has the user interface functions like keyboard and display, Internet connectivity, Real Time Clock, Buzzer and serial ports; said operator panel powered by a processor and operating system, working on 230 vAC input and has a standby supply from battery. The operator terminal communicate to Key control Board which monitors and controls the keys. The Key Control Board has a micro-controller controlling the solenoids and LED indicators and monitors the limit switches.

The operator terminal has provisions for optional features like Wireless LAN or GPRS for communication and devices for authentication through its serial and PCMCIA ports. The Key Control board has the option of interfacing with i-buttons.

In, particular, according to an exemplary embodiment the system can have the following specifications:
Operator Terminal:
Display: LCD Color graphics, 3.1"
Keyboard: 12 keys tactile
Serial Ports Ethernet, RS485, RS232
Alarm: Buzzer
Time: Real Time Clock with batter back-up
Power supply; 230 Vac, 50 Hz
Battery back-up: with batter back-up
Power supply; 230 Vac, 50 Hz
Battery back-up: Yes, Rechargeable 6 Amp-hrs
Expansion: PCMCIA slot
Key Control board:
Serial post: RS485
Inputs: 32 (Limit Switches)
Outputs: 64 (Solenoids, LEDs)
Power Supply: 230 Vac, 50 Hz
Battery back-up: Yes, Rechargeable 6 Amp-hrs
Option: 1 wire interface for i-Buttons Importantly, the Key Safe Boxes in the above system is adapted for the advantageous features including driven by activity as primary login engine; identified by user and password; the Data is Encrypted at the FTP level; the back up with Central server; analyzes an activity; classify exceptions based on frequency and time; report exceptions directly to authorized personnel; an acknowledgement system in the transfer of data to FTP system; encryption of basic data movement is redundant because of own network and because the network and key safe are authorization protected; closure of error loop; Email sent on error; Login with user id and password; Possibility of clearing the error by authorized manager; The Last 16000 events are available on the key box at all times;

Capability to be alert for frequency and time violations; Automatic back up on ftp system removing need for consolidated central server option; Primary function is now exception monitoring than key usage as earlier; Automatic emailing capability; Encryption of data by 128 bit two fish system; Automatically recognizes User and activities he can do; Will recognize Keys taken for an activity and request return of keys for a pending activity; Will automatically transfer data to the Server and AM ALIVE STATUS!! Every hour when there is no activity; Each transfer is verified by the key box to ensure complete handshake of data; If not complete repeated attempts are made to transfer of data; During a network failure, the data is stored in the key box and when the network connection is restored all the data is transferred to the server and the rules are applied against that activity; Exception emails are sent as they occur from server; Theoretically if connectivity is in place, then the emails would be few minutes behind the exception activity itself; Each transfer is verified by the key box to ensure complete handshake of data; and If not complete repeated attempts are made to transfer of data.

Advantageously, also during a network failure, the data is stored in the key box and when the network connection is restored all the data is transferred to the server and rules are applied.

As apparent from the above disclosure, in the activity management system performed by key operation, there is provided controlled access to keys based on activities and user profile defined unique PIN allowing access to keys. The key control box housing critical keys associated with equipments/components, in a safe and secured manner to allow or deny access selectively based on PIN. Key board in the form of a key pad carried by the key safe. The key control provide for capturing and transmitting events and alarms data for central monitoring and analysis. There is provided security of keys during exceptional events/circumstances like power failure. The communication/exchange of signals from the key to keybox is achieved by electromagnetic means. The system incorporates electronic sensors and processors/chips in place of tags to be attached to the keys wherein PIN, access code, activities can be encrypted. The processor embodies device like reader, biometric means with keypad for user authentication. Specially designed key holding catches with mechanical cylinders provided in the key boxes to insert the keys with sensors/microprocessors/chips.

The details of the invention, its objects and advantages are explained hereunder in greater detail in relation to non-limiting exemplary illustrations as per the following accompanying figures.

DETAILED DESCRIPTION OF THE ACCOMPANYING FIGURES

Figure 1:
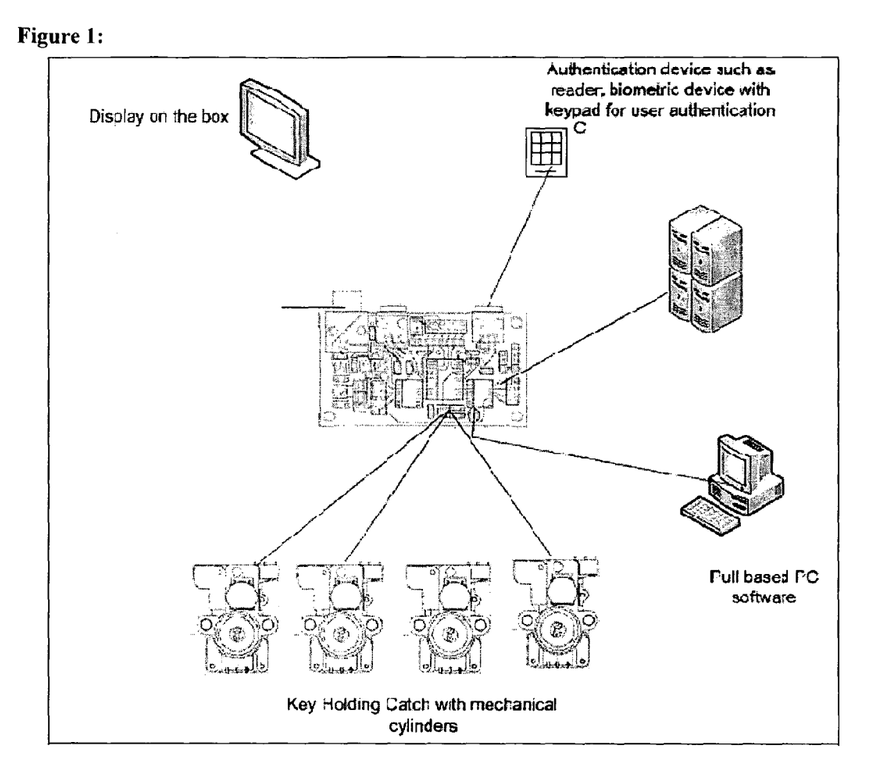
FIG. 1: is a schematic illustration of system in accordance with the present invention.

Reference is first invited to accompanying FIG. 1 which illustrates the schematics of the system of the invention involving the key holding catch with mechanical cylinders, pull based PC software, authentication device such as reader, biometric device with keypad for user authentication and display on the box.

As apparent from the FIG. 1 the system basically involves activity management providing access to keys with controlled access based on activities and user profile defined unique PIN for access to keys, a key control box, electronic sensors/microprocessor/chips in place of tags to be attached to the keys wherein PIN, access code, activities can be encrypted and specially developed key holding catches in the key boxes to insert the keys with sensors/microprocessor/chips.

More specifically, by way of the above system of FIG. 1 the activity based management system by controlled access for certain activity can be limited and monitored by key. The system provides key actuated software and processor based control for restriction of time/sequence/duration of an activity. The system provides data mining facility for the exception in number of activities and their timing and do not impose any restriction on usage at any point of time. The record for all the activities stored and displayed when needed.

Figure 2:
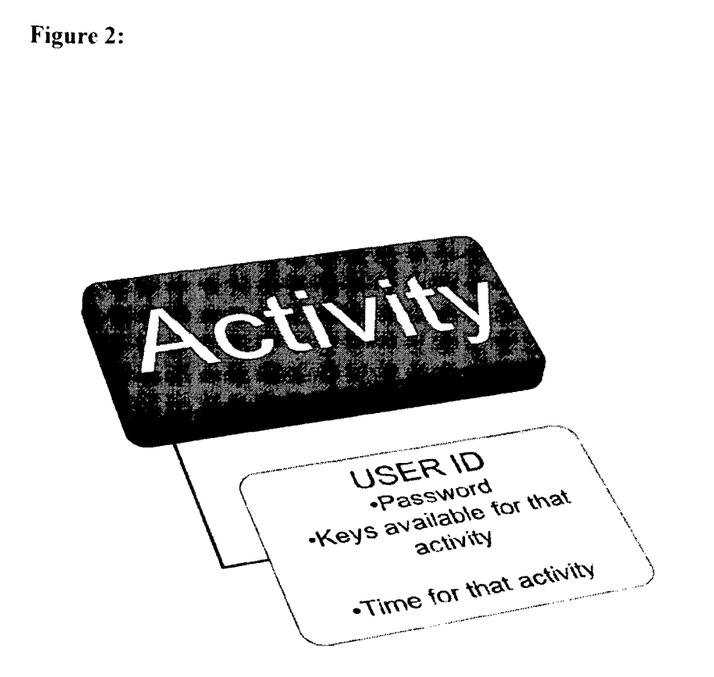
FIG. 2: is an illustration of one embodiment of a present invention.

Reference is now invited to FIG. 2 which explains that each activity is mapped to the keys and the users are authorized to perform the activity by providing the user ID and the password. The said association of activities with keys and users resulting in the system managing keys with the defined activities.

Figure 3:
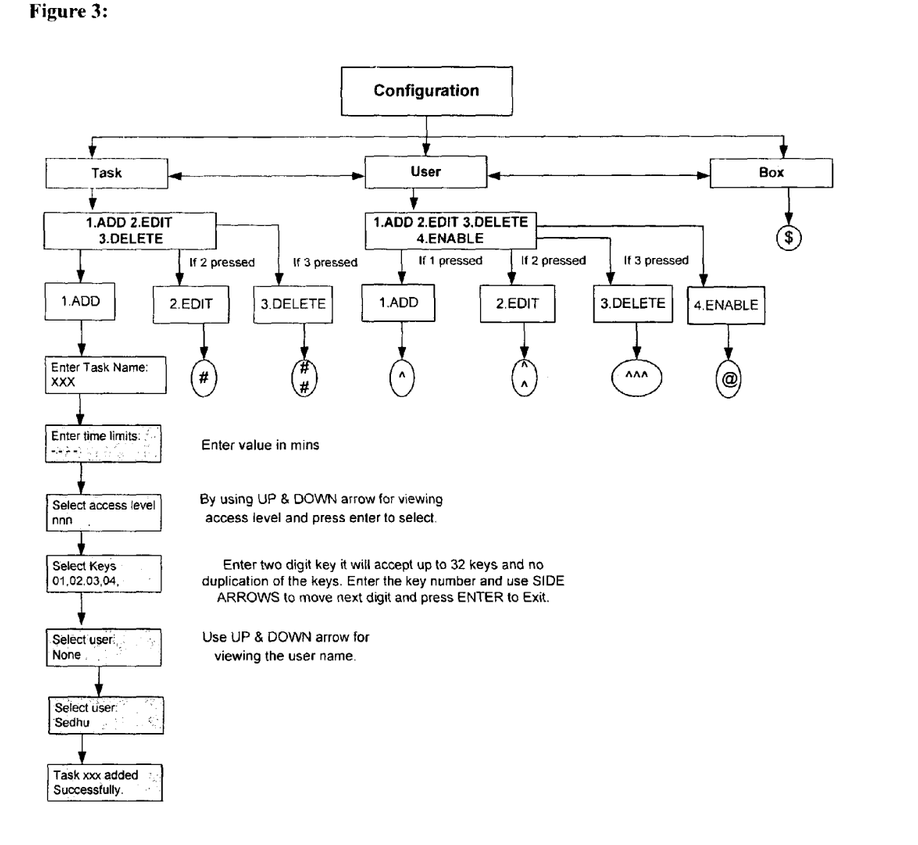
FIG. 3: illustrates conceptually the configuration of Task, User and Box.

FIG. 3 conceptually illustrates the configuration of Task, User and Box. In the configuration of the task, # is pressed to add, # is pressed twice to edit and # is pressed thrice to delete. After pressing #, the system asks to enter the task name. After entering the task name it is required to enter the time limits in minutes. The system further asks to select the access level. Up and down arrow are used for viewing the access level and the required access level can be selected by pressing enter. Further it is required to select the keys which can be from 01 to 32. Side arrows are used to choose the keys. Press enter to exit. Further the user should be selected by using up and down arrow for viewing and the task is assigned.

In the configuration of the user, ˆ is pressed to add, ˆ is pressed twice to edit and ˆ is pressed thrice to delete. For enabling the user @ is pressed.

Figure 4:
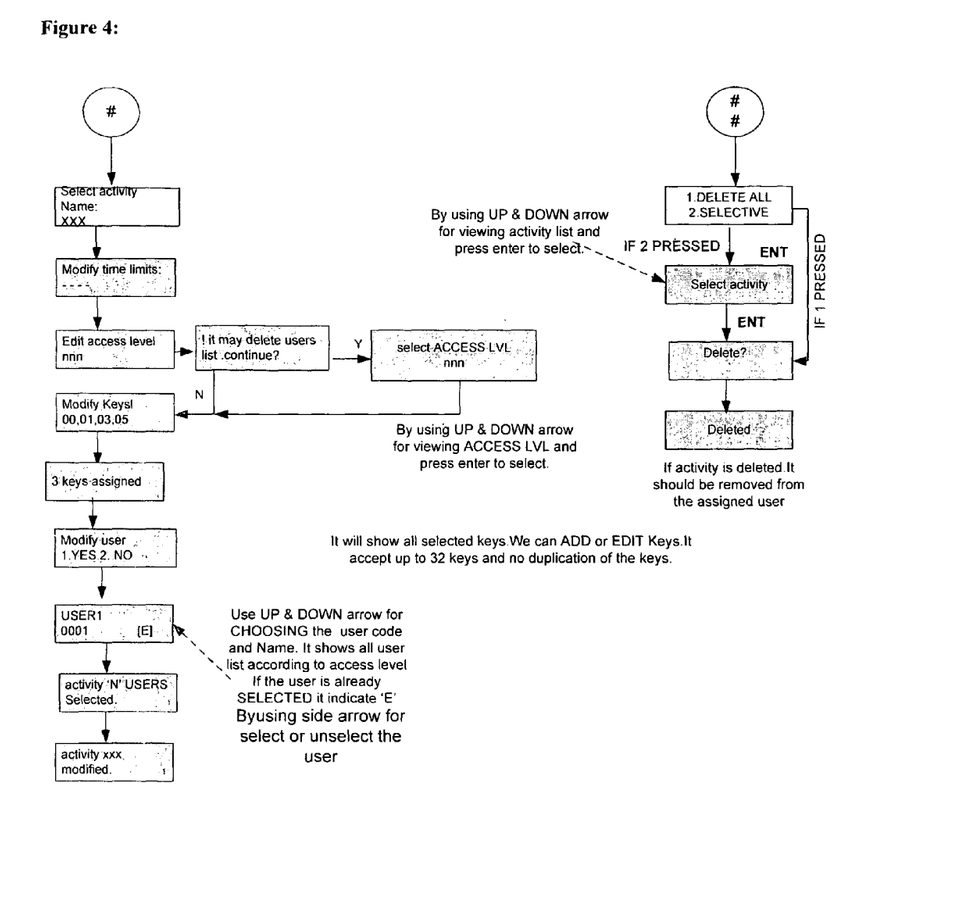
FIG. 4: illustrates conceptually the creation of a plurality of user designed activities.

Reference is now invited to FIG. 4, which illustrates conceptually the creation of a plurality of user designed activities.

# is pressed and the activity is selected. Further the time limit is modified. Further more in order to edit access level, Y is pressed to continue because it may delete users' name. N is pressed if not to edit access level and the system flows to modify keys. Further the keys are assigned. Further more 1 is pressed to modify user and 2 is pressed not to modify the user. After pressing 1, up and down arrow are used for choosing the user code and name. It shows the entire list according to access level. If the user is already selected it indicate 'E'. Side arrows can be used to select or unselect the user. Then the activity 'N' users are selected and the activity is modified. For deleting activity # is pressed twice. 1 is selected to delete all and 2 is pressed to select the activity and delete. After pressing the necessary number enter is pressed for deletion of the activity.

Figure 5:
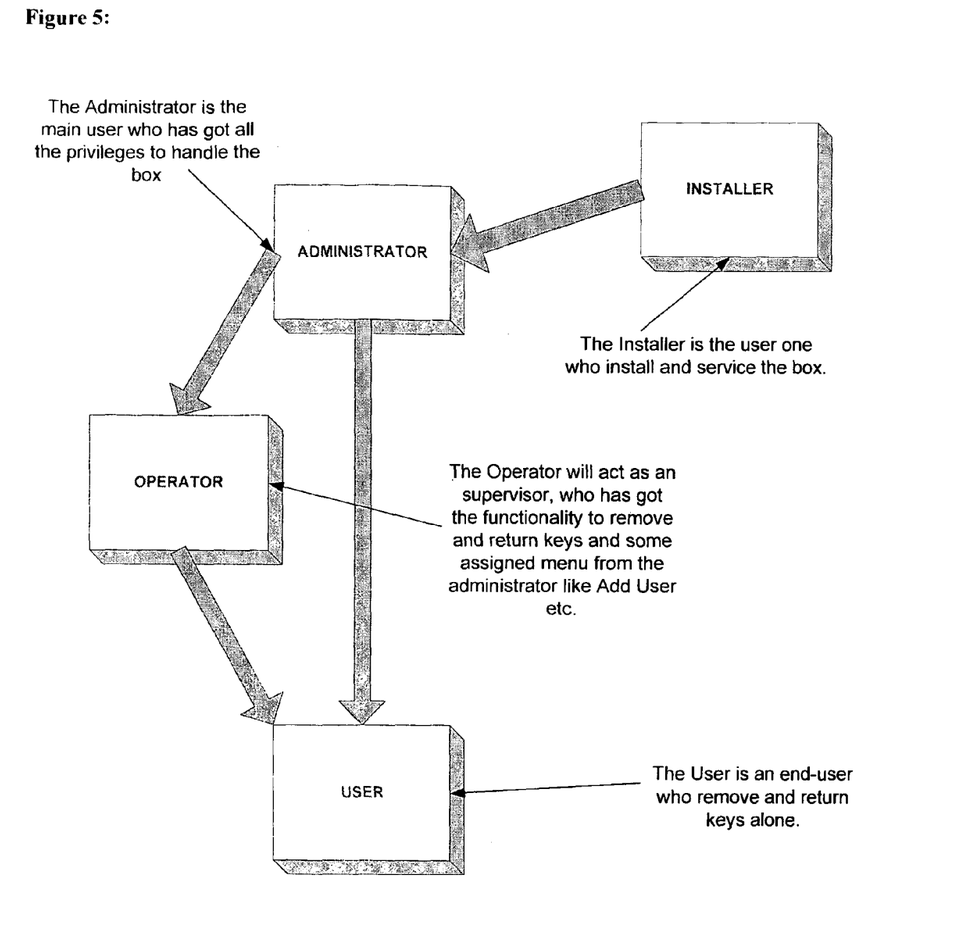
FIG. 5: illustrates the block diagram to describe the implementation of the present invention.

Reference is now invited to FIG. 5, wherein the activity management system comprises a software which is configured to obtain administrative and or user input from the keybox and transmit the same to a stand alone or networked computer to facilitate central monitoring. As explained in the block diagram the installer is the user, one who installs and services the box. The administrator is the main user, who has got all the privileges to handle the box. The operator will act as a supervisor, who has got the functionality to remove and return keys and some assigned menu from the administrator like add user etc. The user is an end-user who removes and returns keys alone.

Figure 6:
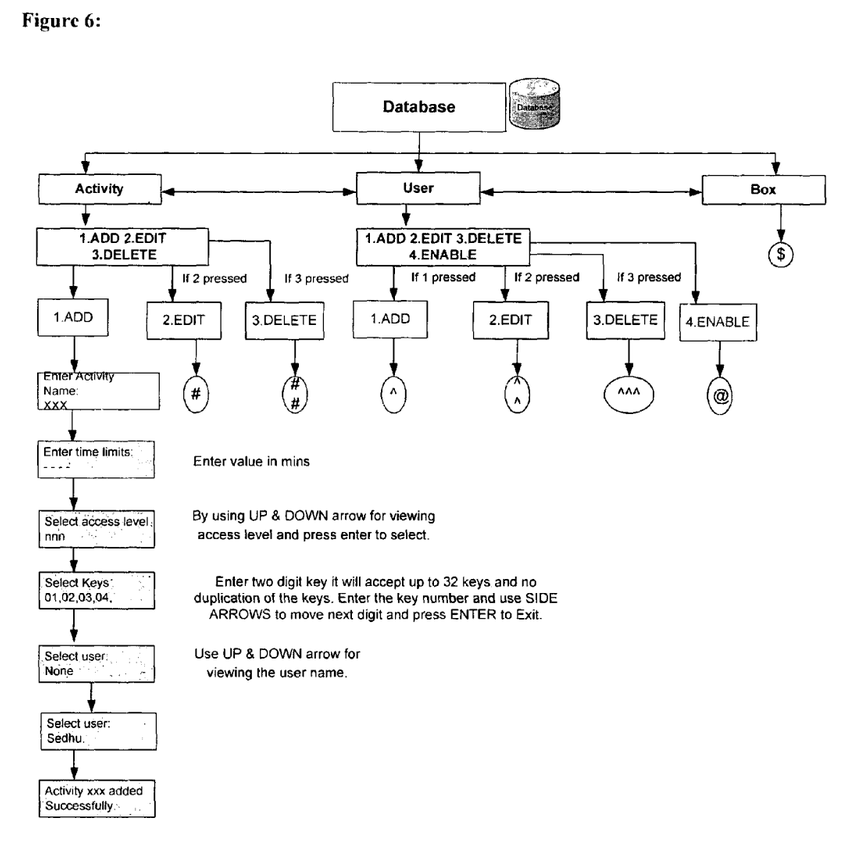
FIG. 6: illustrates conceptually that in the activity based management system, the software includes a database where the data relating to the control rules of the activities are defined and maintained.

FIG. 6 conceptually illustrates functions of the database in the activity based management system where the data relating to the control rules of the activities are defined and maintained.

Figure 7:
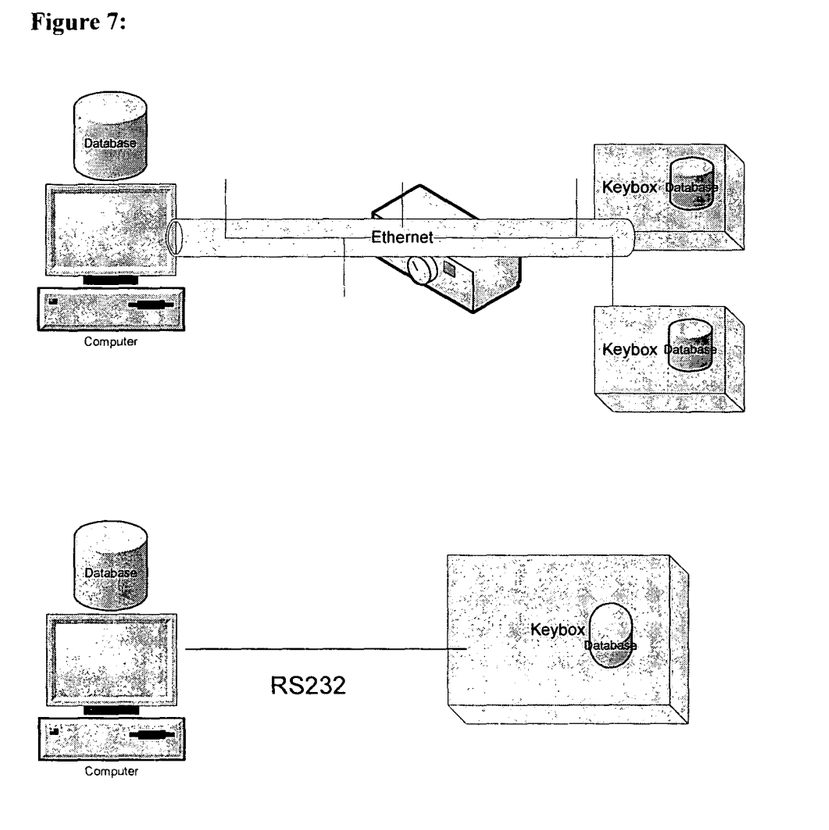
FIG. 7: illustrates conceptually that the interface provides real time and/or on demand and for synchronizable data interface between the keybox and the Central monitoring unit.

Reference is now invited to FIG. 7 which illustrates the real time and/or on demand and/or synchronizable data interface between the keybox and the Central monitoring unit. In the above said figure the network connectivity between the keybox database and the central computer database are made by using an ethernet. The connectivity can also be provided vide the internet or wirelessly.

Figure 8:
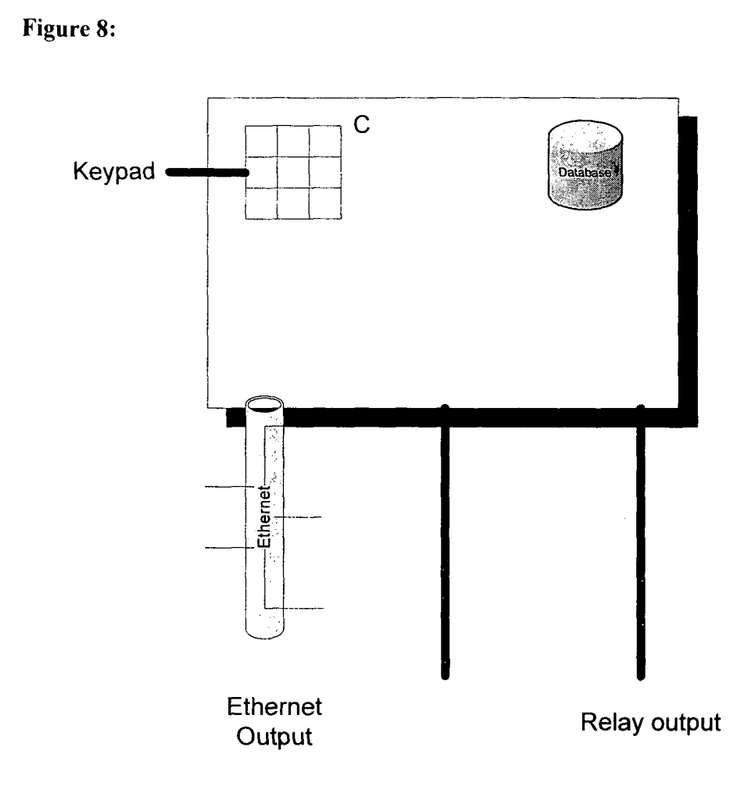
FIG. 8: illustrates conceptually that the keybox has at least one memory device, processor, input and output ports.

FIG. 8 illustrates a variation wherein the keybox has at least one memory device, processor, input and output ports. In the said figure the keypad is connected to the input port. The ethernet and the relay are the output ports.

Figure 9:
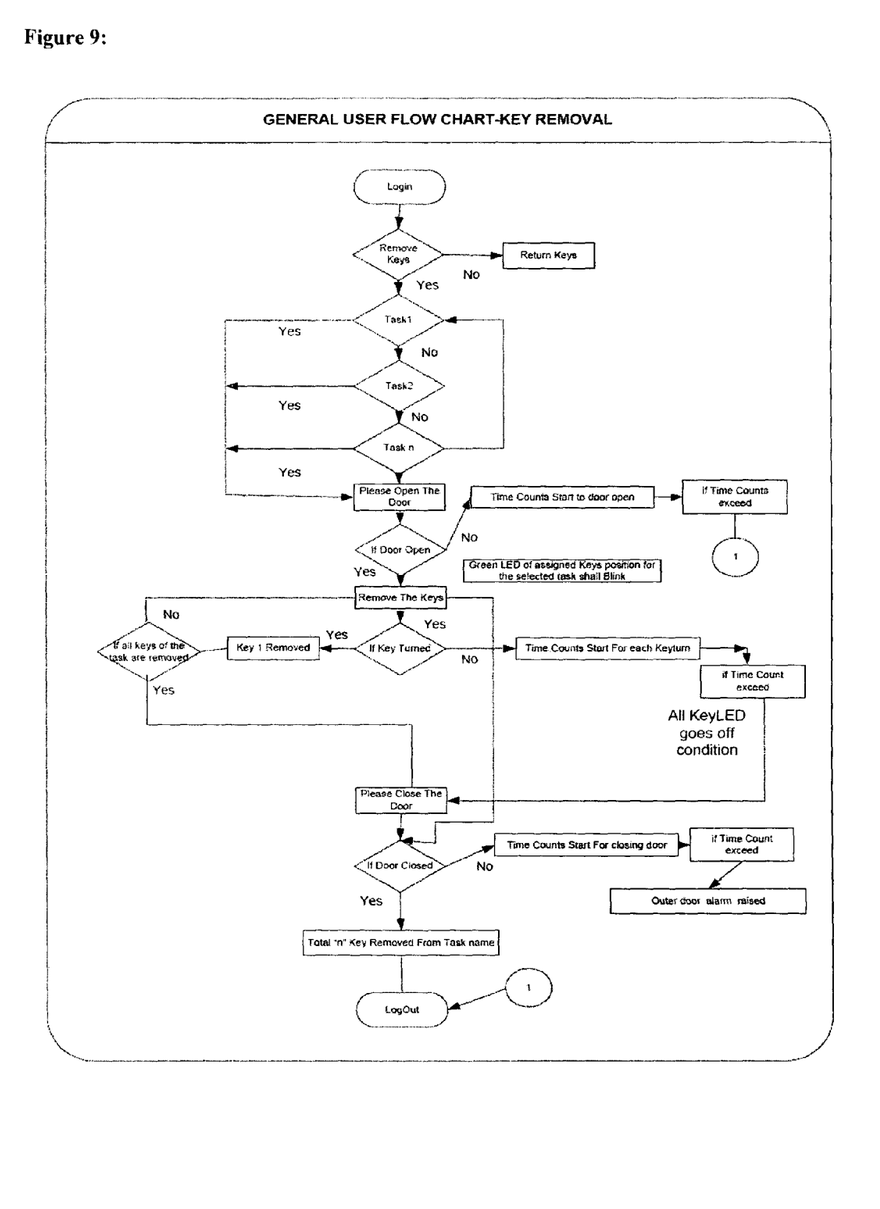
FIG. 9: is an illustration of general user flow chart-key removal in accordance with the present system.

A flow chart of the general user key removal using the system of the invention is illustrated in accompanying FIG. 9. Wherein, initially the user has to login by using the assigned user name and password. Then the option for key remove or key return has to be chosen. The user has to enter the task until all the tasks are entered. Further the door is opened and the green LED of assigned keys position for the selected task shall blink. If the door is not opened, the time counts starts to door open. On opening the door the user shall remove the keys until all the keys for the task are removed. If the keys are not turned for removal the time count start for each keyturn and if the time count exceed all key LED goes to off condition. After removing the keys the door should be closed and the users can logout. If the door is not closed the time count start for closing the door and if the time count exceed the outer door alarm is raised.

Thus the keybox is adapted to allow access after (i) user authentication; (ii) activity from which access is required (iii) keys mapped for the chosen activity. The keybox is adapted such as to allow the user to the activity allocated and allow access to only for the activities for which he/she is authorized.

Figure 10:
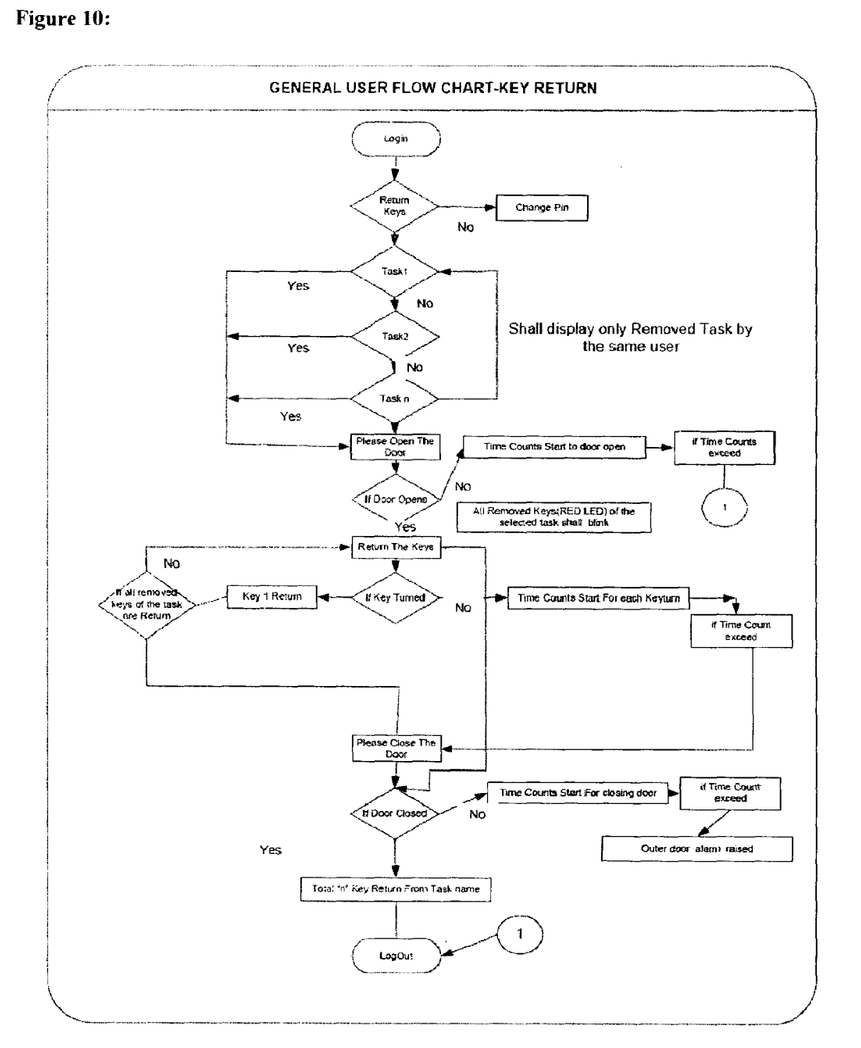
FIG. 10: is an illustration of general user flow chart-key return in accordance with the present system.

A flow chart of the general user key return using the system of the invention is illustrated in accompanying FIG. 10. Wherein, initially the user has to login by using the assigned user name and password. Then the option for key return is to be chosen. The user has to enter the task until all the tasks are entered and the system shall display only removed task by the same user. Further the door is opened and the Red LED of all removed keys of the selected task shall blink. If the door is not opened, the time counts starts to door open. On opening the door the user shall return the keys until all the removed keys of the task are returned. If the keys are not turned for return the time count start for each keyturn and if the time count exceeds the door shall be closed. After returning the keys the door should be closed and the users can logout. If the door is not closed the time count start for closing the door and if the time count exceed the outer door alarm is raised.

I claim:

1. An activity based key management system for the users, comprising:
   one or more key boxes which houses electronic holding devices adapted to hold one or more keys;
   an integrated activity management system;
   a plurality of activity operationally defined; and
   an interface to administer access to the keys based on one or more defined activities,
   wherein each activity is mapped to one or more keys,
   wherein the users are authorized to perform one or more of the defined activities,
   wherein said association of activities with keys and users results in the system managing keys in accordance with the defined activities, and
   wherein the integrated activity management system provides for creation of a plurality of user designed activities locally at the key box and/or remotely.

2. The activity based key management system according to claim 1, wherein the key would either be mechanical key or smart key or a housed key in one or more key box.

3. The activity based key management system according to claim 1, wherein the access to individual keys is based on activities that includes operational time, date, duration and frequency.

4. The activity based key management system according to claim 1, wherein the system is configured to obtain administrative and or user input from the key box and transmits the same to a standalone or networked computer to facilitate central monitoring.

5. The activity based key management system according to claim 1, wherein the system includes a database where the data relating to the control rules of the activities are defined and maintained.

6. The activity based management system according to claim 1, wherein the interface provides real time and/or on demand and/or synchronizable data interface between the key box and the central monitoring unit.

7. The activity based key management system according to claim 1, wherein the key box has at least one memory device, processor, input and output ports.

8. The activity based key management system according to claim 7, wherein the key box is adapted to allow access after
   (i) user authentication;
   (ii) activity for which access is required; and
   (iii) keys mapped for the chosen activity,
   wherein the user authentication is by means of user id and password, proximity or magnetic cards or biometric.

9. The activity based key management system according to claim 8, wherein the key is monitored and subject to audit trial once it is removed from the key box and the key box is adapted to provide alerts on any non conformance of the defined control rules.

10. The activity based key management system according to claim 9, wherein the key box has a secured enclosure for housing the keys associated with assets/components; adapted to provide controlled access based on user profile for access to keys; a keyboard in the form of a key pad; means for capturing and transmitting events and data for central monitoring and analysis; means for securing the keys during exceptional events/circumstances required special security; and electromagnetic communications means for exchanging signals between key and key boxes.

11. The activity based key management system according to claim 10, wherein the key/key box is adapted such as to allow the user to the activity allocated and allows access to only for the activities for which the user is authorized.

12. The activity based key management system according to claim 11, wherein the key box is adapted to capture and transmit to the central monitoring unit as part of the event log at least the following inputs:
keybox number;
user id;
date and time;
activity code;
exception code; and
nature of exception and description.

13. The activity based key management system according to claim 12, wherein the central monitoring unit is adapted to verify the errors and/or exceptions and generate related alerts for the required recipients as per the system configuration.

14. The activity based key management system according to claim 12, wherein the key box is adapted to generate reports including various details of events, exceptions, alerts with various filters including specific time period, specific keys, specific users or user category and answering specific query from database to generate the data required for any specific parameter with respect to another parameter or parameters (single or multiple).

15. The activity based key management system according to claim 14, wherein the key box is adapted to provide for a plurality of hierarchical levels of access.

* * * * *